United States Patent
Inoue

(10) Patent No.: US 6,339,790 B1
(45) Date of Patent: *Jan. 15, 2002

(54) METHOD AND SYSTEM FOR CONTROLLING DATA DELIVERY AND RECEPTION BASED ON TIMESTAMPS OF DATA RECORDS

(75) Inventor: Yoshitsugi Inoue, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,263

(22) Filed: Oct. 7, 1998

(30) Foreign Application Priority Data

Mar. 16, 1998  (JP) ............................................ 10-065178

(51) Int. Cl.[7] ......................... G06F 15/16; G06F 15/173
(52) U.S. Cl. ......................... 709/224; 709/206; 709/217
(58) Field of Search ................................. 709/206, 225, 709/207, 201, 224, 232, 317, 318, 217; 714/4, 15, 18, 48, 723; 455/405, 406, 407

(56) References Cited

U.S. PATENT DOCUMENTS

| | | | | |
|---|---|---|---|---|
| 5,835,915 A | * | 11/1998 | Carr et al. .................... | 707/202 |
| 5,850,388 A | * | 12/1998 | Anderson et al. ............ | 370/252 |
| 5,896,506 A | * | 4/1999 | Ali et al. ..................... | 709/213 |
| 5,964,831 A | * | 10/1999 | Kearns et al. ............... | 709/201 |
| 5,974,448 A | * | 10/1999 | Yamauchi et al. .......... | 709/206 |
| 5,978,813 A | * | 11/1999 | Foltz et al. .................. | 707/201 |
| 5,987,503 A | * | 11/1999 | Murakami ................... | 709/204 |
| 5,996,011 A | * | 11/1999 | Humes ........................ | 709/225 |
| 6,067,541 A | * | 5/2000 | Raju et al. ................... | 707/3 |
| 6,078,930 A | * | 6/2000 | Lee et al. .................... | 707/202 |
| 6,115,040 A | * | 9/2000 | Bladow et al. ............. | 345/335 |
| 6,148,308 A | * | 11/2000 | Neubauer et al. ........... | 707/203 |
| 6,148,338 A | * | 11/2000 | Lachelt et al. .............. | 709/224 |
| 6,157,955 A | * | 12/2000 | Narad et al. ................ | 709/228 |

FOREIGN PATENT DOCUMENTS

JP          2-246554          10/1990

* cited by examiner

Primary Examiner—Zarni Maung
Assistant Examiner—Jason D. Cardone
(74) Attorney, Agent, or Firm—Rosenman & Colin LLP

(57) ABSTRACT

A method and system for controlling data delivery and reception, which alleviate the processing workloads imposed on management systems and reduce the hardware and software resources required in management systems. Each time a status message arrives from network subsystems, a data storage unit in a management system stores the received information, together with a reception timestamp. At regular intervals, or on an on-demand basis, a data requesting unit in a terminal station issues a data delivery request message to the management system, including a reception time specification to qualify the data records to be delivered. In response to the request, a data retrieval unit in the management system searches its local data storage to extract the requested data records whose reception timestamps are not earlier than the given reception time specification. The data records found are then supplied to a data transmission unit. The data transmission unit delivers them to the requesting terminal station, affixing a transmission timestamp. In the requesting terminal station, a timestamp storage unit saves the transmission timestamp received, while a reception processing unit applies a series of processing operations to the received message to make it suitable for the terminal station.

10 Claims, 12 Drawing Sheets

FIG. 7 (A) — Unchecked data storage unit 43e

FIG. 7 (B) — Checked data storage unit 43g

METHOD AND SYSTEM FOR CONTROLLING DATA DELIVERY AND RECEPTION BASED ON TIMESTAMPS OF DATA RECORDS

BACKGROUND OF THE INVENTION

1. Field of the Invention

The present invention relates to a method and system for delivering and receiving data, and a data delivery and data reception mechanisms therefor. More particularly, the present invention relates to a method and system for controlling data delivery and reception in an environment where at least one management system collects and manages data and at least one terminal station connects to said at least one management system to make access to the data stored therein. The present invention further relates to a data delivery and data reception mechanisms to be implemented as part of the above system, and also to a data delivery and reception system based on the Internet or other on-line services, in which servers (or management systems) provide their clients (or terminal stations) with information delivery services.

2. Description of the Related Art

Monitoring data traffic on a network and activities of network devices is one of the important functions of network management. Typically, in a distributed network management environment, a plurality of management systems collect operational status information concerning their respective network subsystems and maintain the collected information in their local storage. Network operators at remote locations perform administrative actions to control the entire network, making access to the information stored in the management systems through their local terminal stations.

In conventional network management systems, status changes and critical events occurred in a subsystem are reported to its local management system in the form of status messages with appropriate timestamp information indicative of their occurrence times. Upon receipt of such status messages, the recipient management system saves the received data into its storage unit, and if required, rearranges the collected data records in the order of their occurrence times. Terminal stations are allowed to make a connection to the management system at any time they need the delivery of data records stored therein. The management system responds to this data delivery request by returning the latest data records to the requesting terminal stations. Note here that the management system keeps a log of what data records are delivered to which terminal station. Next time it receives a data delivery request from the same terminal station, the management system selectively sends undelivered data records to the terminal station by referring to the log information.

A first problem with the above-described conventional systems is that event occurrence timestamps affixed to the status messages are based on each subsystem's local clock. Such local clocks may not always be accurate enough, and it is hard to guarantee their synchronization. Because of this limited reliability, the data rearrangement based on the event occurrence timestamps could result in an incorrect sequence of data records.

To solve this problem, some conventional management systems use time offset data to compensate for the chronological differences among subsystems. They rearrange the collected data records after making a correction to the original event occurrence timestamps with those time offset data. This technique, however, requires the management systems to spend more processing resources.

Another problem with the conventional management systems is that they have to maintain a log of what data records have been delivered to which terminal station. This task consumes much storage space in the management systems, besides imposing more workloads on them. That is, higher-class computers are required as the management system platforms.

SUMMARY OF THE INVENTION

Taking the above into consideration, an object of the present invention is to provide an improved method and system for controlling data delivery and reception, which makes it possible to alleviate the processing workloads imposed on management systems and reduce the hardware and software resources required in management systems.

To accomplish the above object, according to the present invention, there is provided a system for controlling data delivery and reception in such an environment where at least one management system collects and manages data and at least one terminal station connects to said at least one management system to make access to the data stored therein. This data delivery and reception system comprises the following elements: (a) a data storage unit, disposed in the management system, to store data records together with reception timestamps indicative of the time when each data is received by the management system; (b) a data requesting unit, disposed in the terminal station, to send a request to the management system to deliver the data records, the request including a time specification for qualifying the data records to be delivered; (c) a data retrieval unit, disposed in the management system and responsive to the request sent from the data requesting unit, to retrieve, out of the data storage unit, relevant data records whose reception timestamps are not earlier than the time specification included in the request; (d) a data transmission unit, disposed in the management system, to transmit to the terminal station the data records retrieved by the data retrieval unit, together with a transmission timestamp; (e) a timestamp storage unit, disposed in the terminal station, to store the transmission timestamp sent together with the data records from the data transmission unit; and (f) a data reception unit, disposed in the terminal station, to receive the data records sent from the data transmission unit.

The above and other objects, features and advantages of the present invention will become apparent from the following description when taken in conjunction with the accompanying drawings which illustrate a preferred embodiment of the present invention by way of example.

DESCRIPTION OF PREFERRED EMBODIMENT

An embodiment of the present invention will be described below with reference to the accompanying drawings.

Figure 1:
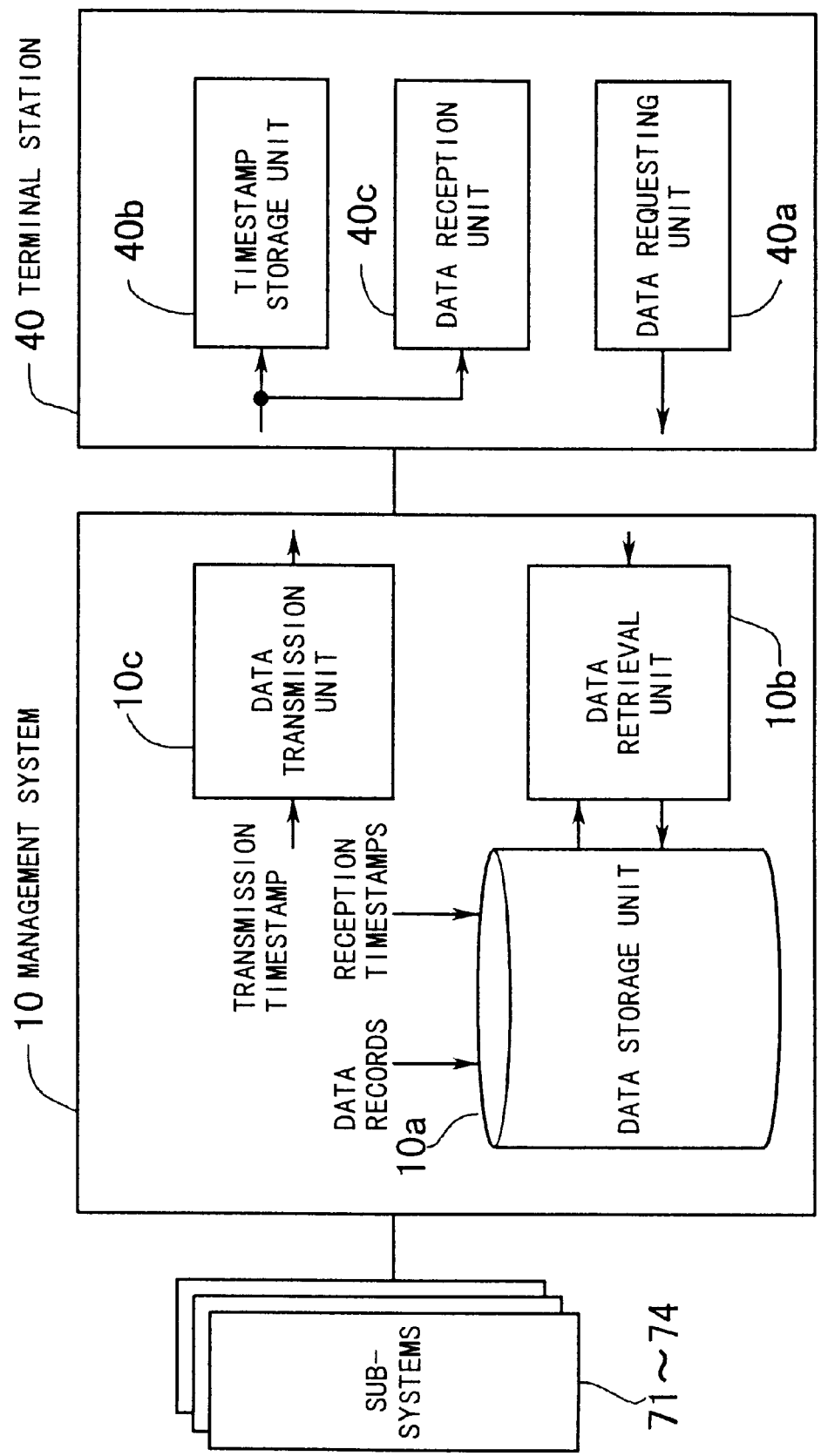
FIG. 1 is a conceptual view of the present invention.

Referring first to FIG. 1, the following will describe the concept of a data delivery and reception system according to the present invention. More specifically, the data delivery and reception system of FIG. 1 is organized by a data delivery mechanism implemented in a management system 10 and a data reception mechanism implemented in a terminal station 40. This proposed system comprises the following elements:

(a) a data storage unit 10a, disposed in the management system 10, to store data records together with reception timestamps indicative of the time when each data is received by the management system 10;

(b) a data requesting unit 40a, disposed in the terminal station 40, to send a request to the management system 10 to deliver the data records, along with a time specification for qualifying the data records to be delivered;

(c) a data retrieval unit 10b, disposed in the management system 10 and responsive to the request sent from the data requesting unit, to retrieve, out of the data storage unit 10a, relevant data records whose reception timestamps are not earlier than the time specification included in the request;

(d) a data transmission unit 10c disposed in the management system 10, to transmit to the terminal station 40 the data records retrieved by the data retrieval unit 10b, together with a transmission timestamp;

(e) a timestamp storage unit 40b disposed in the terminal station 40, to store the transmission timestamp sent together with the data records from the data transmission unit 10c; and (f) a data reception unit 40c disposed in the terminal station 40, to receive the data records sent from the data transmission unit 10c.

In the structural arrangement described above, subsystems 71 to 74 supply the management system 10 with their operational status information successively through the connections established on the network. Each time such information arrives, the data storage unit 10a in the management system 10 stores the received information, together with a reception timestamp. More specifically, this reception timestamp is obtained by sampling a value of the management system 10's local timebase at the instant when the information is entered to the management system 10.

Suppose here that the data requesting unit 40a in the terminal station 40 has requested the management system 10 to deliver the stored records, designating a specific point in time which is referred to as a "reception time specification." In this situation, the data retrieval unit 10b in the management system 10 searches the data storage unit 10a for relevant data records whose reception timestamp are equal to or later than the time point designated by the terminal station 40. If such data records are found, the data storage unit 10a supplies them to the data transmission unit 10c. The data transmission unit 10c then transmits the data to the terminal station 40, affixing a transmission timestamp to them. More specifically, this transmission timestamp is obtained by sampling a value of the management system 10's local timebase at the moment when the management system 10 is about to transmit the retrieved data records.

In the requesting terminal station 40, the timestamp storage unit 40b stores the transmission timestamp that is attached to the data records sent from the data transmission unit 10c. This stored transmission timestamp will be used later as a new reception time specification, when the data requesting unit 40a sends a data delivery request again. The data reception unit 40c, on the other hand, receives messages sent from the data transmission unit 10c and applies a series of processes to make it suitable for the terminal station 40.

As described above, according to the present invention, the management system 10 gives a reception timestamp when it receives data from the subsystems 71 to 74. Since network events are reported to the management system 10 immediately at their occurrences, the reception timestamps based on the management system 10's local timebase are considered to have enough quality as the records of event occurrence times measured in a unified manner. With this quality and reliability, the data retrieval unit 10b relies solely on the reception timestamps when extracting necessary information from the data storage unit 10a. Recall that conventional systems require chronological compensation for the time differences among local clocks of distributed subsystems. As opposed to this, the present invention makes it possible to eliminate such time correction, thus reducing the processing workloads imposed on the management system 10.

Further, in the present invention, the terminal station 40 employs a data requesting unit 40a to provide the management system 10 with a reception time specification when it issues a data delivery request. The management system 10, on the other hand, has a data retrieval unit 10b that is designed to retrieve and deliver data records having reception timestamps not earlier than the reception time specification. This feature of the present invention eliminates the need for keeping a log of what data records have been delivered to which terminal station, thus allowing the management system to be implemented on a simple and small platform.

Now, the embodiment of the present invention will be explained in detail below. In the following session of FIGS. 3 and 4, the functional blocks shown in FIG. 1 are implemented as follows:

data storage unit 10a—data storage unit 14 and first combination unit 13 data retrieval unit 10b—data retrieval unit 15 data transmission unit 10c—data transmission unit 17 and second combination unit 16 data requesting unit 40a—data requesting unit 43a and reception time specification unit 43b timestamp storage unit 40b—timestamp storage unit 43d data reception unit 40c—unchecked data storage unit 43e, checked data transfer unit 43f, checked data storage unit 43g, retrieved data storage unit 43h, checked data marking unit 43i, display unit 43j, data arrangement unit 43k, and data reading unit 43m.

Figure 2:
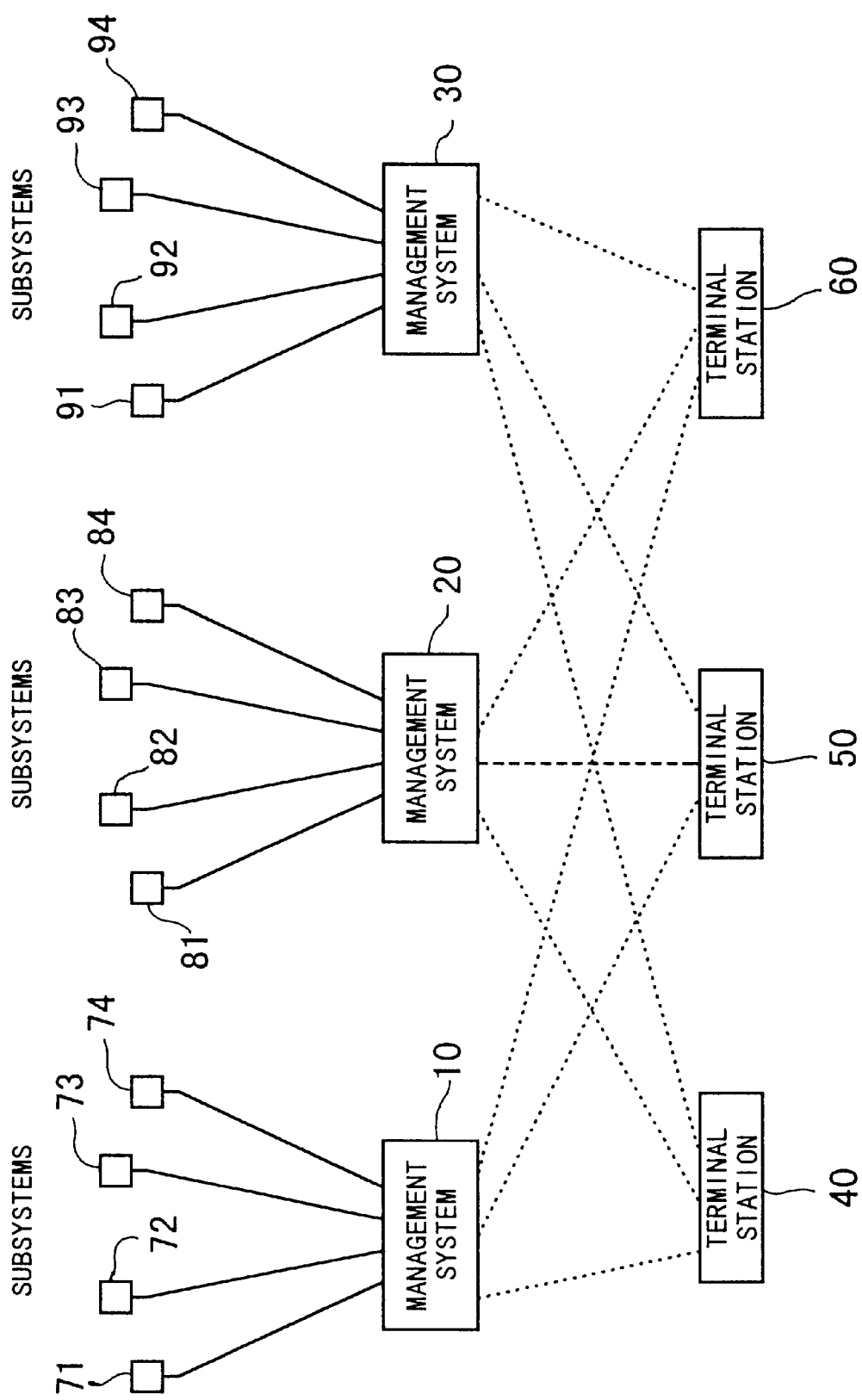
FIG. 2 is a block diagram depicting network subsystems, management systems, and terminal stations, in which a data delivery and reception system of the present invention is embodied.

FIG. 2 is a block diagram of a distributed network management system including network subsystems, management systems, and terminal stations, in which a data delivery and reception system of the present invention is embodied. Although FIG. 2 does not explicitly show their details, a plurality of subsystems 71 to 74 are coupled to various network devices constituting a first communications network, in order to monitor the data traffic and device activities on that network. They each collect such operational status information from the first communications network and send it to their local management system 10 for centralized data management. Likewise, a plurality of subsystems 81 to 84 are coupled to other network devices in order to monitor the data traffic and device activities on a second communications network. They collect operational status information from the second communications network and send it to their local management system 20. Further, a plurality of subsystems 91 to 94 are coupled to network devices on a third communications network to monitor the data traffic and device activities on that network. They collect operational status information from the third communications network and send it to their local management system 30. These management systems 10, 20, and 30 manage their corresponding communications networks in a centralized manner on the basis of the operational status information collected from their subordinate subsystems. While such centralized management of status information is normally accomplished by the management systems 10, 20, and 30 running in an automatic mode, it also accepts occasional manual intervention by network operators assigned to each management system.

The system of FIG. 2 actually involves more network operators, who are stationed at remote locations away from the management systems 10, 20, and 30. They can reach the collected operational status information through terminal stations 40, 50, and 60 which connect to the management systems 10, 20, and 30, respectively. It should be noted here that this terminal connection may not be permanent, but can be established temporarily when it is needed. The present system permits the terminal stations 40, 50, and 60 to freely make access to any management systems 10, 20, and 30 in order to provide comprehensive administration and technical support for the three communications networks.

Figure 3:
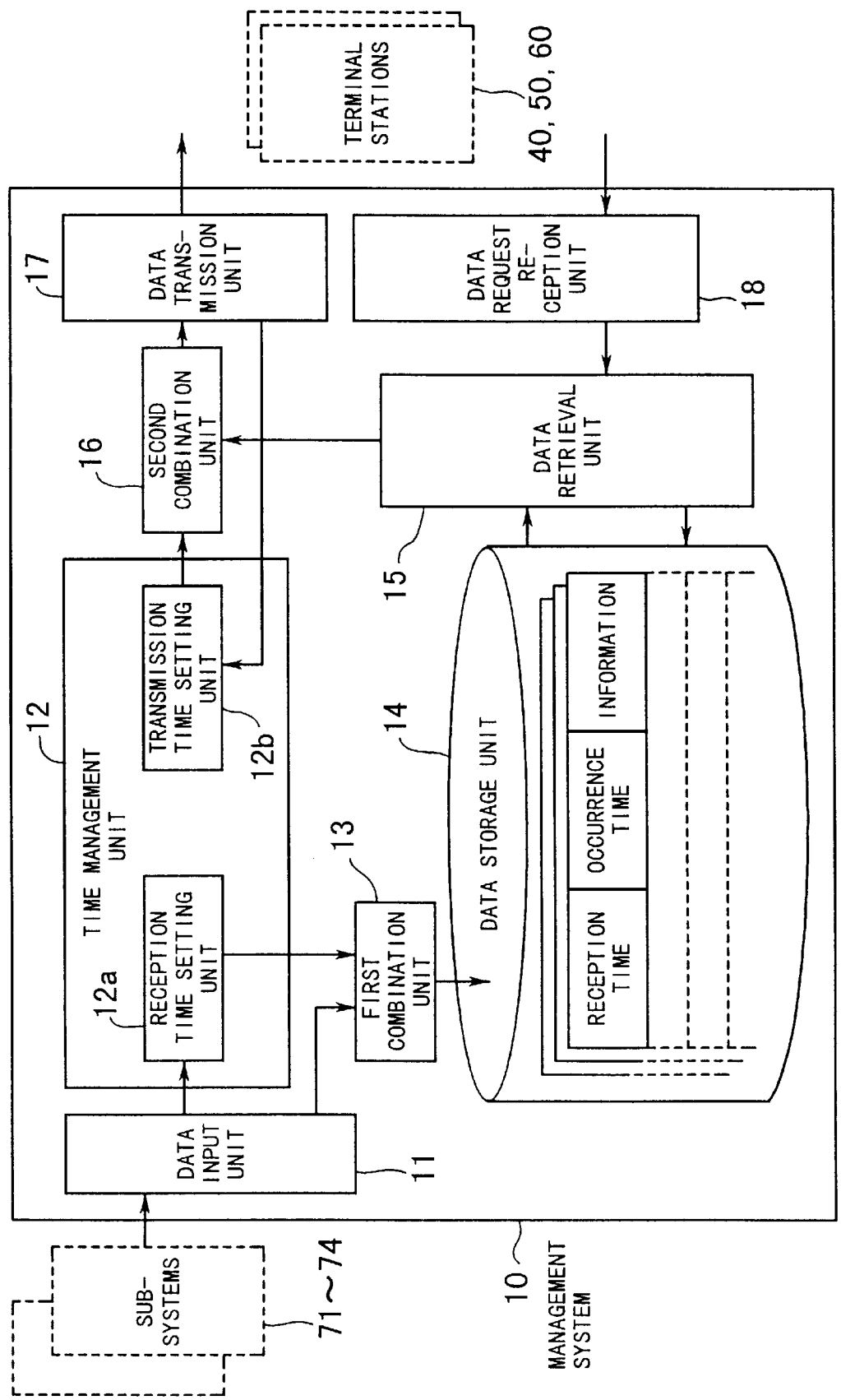
FIG. 3 is a diagram which shows the internal structure of a management system.

FIG. 3 now shows the internal structure of the management system 10, while the other management systems 20 and 30 seen in FIG. 2 have the same internal configuration as the management system 10. While not illustrated in the accompanying drawings, a data processing unit comprising a CPU, RAM, ROM, I/O interfaces, and other components is a suitable platform for the management system 10. All the blocks included the management system 10 of FIG. 3 are implemented as hardware and software functions of such a data processing unit.

Referring to FIG. 3, a data input unit 11 accepts operational status information sent from subsystems 71 to 74. It supplies the received information to a first combination unit 13, as well as sending a trigger signal to a reception time setting unit 12a to indicate the receipt of each information message. What is referred to here as the "operational status information" is status messages transmitted when any critical status change is observed in a network device being monitored by the management system 10. A time management unit 12 gives a reception timestamp to each status message received, based on a local clock that the management system 10 owns. It is also in charge of affixing a transmission timestamp when the stored data records are retrieved and transmitted to the terminal stations 40, 50, and 60. To provide such functionalities, the time management unit 12 comprises a reception time setting unit 12a and a transmission time setting unit 12b. As previously mentioned, the reception time setting unit 12a receives a trigger signal from the data input unit 11, each time a status message arrives from the subsystems 71 to 74. Upon receipt of this trigger signal, the time management unit 12 notifies the first 10 combination unit 13 of the present time of day as a reception timestamp for the received message. The first combination unit 13 responds to this notification by combining the reception timestamp with the received message and sending the results to a data storage unit 14. The data storage unit 14 stores such status messages in the order of their reception timestamps, after classifying them by the types of data content. Note here that each received status message has an event occurrence timestamp that is given at the originating subsystem.

On the right-hand side of the management system 10 shown in FIG. 3, a data request reception unit 18 accepts data delivery request messages from terminal stations 40, 50, and 60. It passes the received message to a data retrieval unit 15 to initiate a data search operation. The data retrieval unit 15 first extracts a reception time specification contained in the data delivery request message. Using the extracted reception time specification as a search keyword, the data retrieval unit 15 searches the data storage unit 14 to find relevant data records whose reception timestamps are not earlier than the specified reception time. The data records retrieved in this way are then sent to a second combination unit 16, together with their respective reception timestamps. The second combination unit 16 passes the retrieved data records to a data transmission unit 17, adding a transmission timestamp provided by the transmission time 10 setting unit 12b. As will be described in the next paragraph, the above operation of the second combination unit 16 is controlled by the value of an "Auto/Manual" field of each data delivery request message sent from terminal stations. More specifically, the second combination unit 16 adds a transmission timestamp when this Auto/Manual field is set to "Auto," but not when it is "Manual." Finally, the data transmission unit 17 assembles a data message by combining the above transmission timestamp, the retrieved data records with reception timestamps, and other necessary field values, for delivery to the requesting terminal station.

Figure 5:
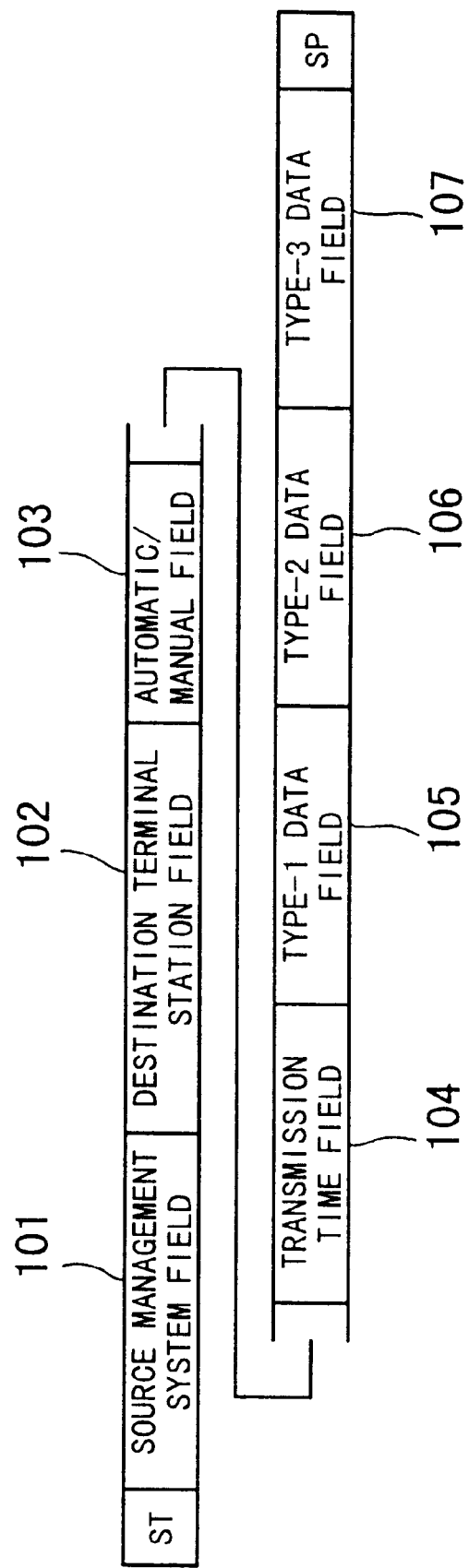
FIG. 5 is a diagram which shows the frame format of a data message.

FIG. 5 shows the frame format of a data message that management systems deliver. The data message has a "Source Management System" field 101 to describe the name of a management system which has originated the message. This field 101 is followed by a "Destination Terminal station" field 102 that shows the name of a specific terminal station to which the message is addressed. In other words, the field 102 indicates which terminal station has requested the delivery of operational status information. A subsequent "Automatic/Manual" field 103 tells what made this terminal station issue the data delivery request. That is, "Automatic" denotes that the request was automatically issued by the terminal station at predetermined intervals, while "Manual" means that the operator of the terminal station entered a command to request information for some specific reason. As will be described later, this Automatic/Manual field 103 is replicated from a data delivery request message received from the requesting terminal station. The data message further has a "Transmission Time" field 104 to indicate when the message was transmitted, whose field value is supplied from the transmission time setting unit 12*b*. Next, a "Type-1 Data" field 105 carries operational status information classified as "Type-1" data, as well as its reception and occurrence timestamps. Likewise, two subsequent fields 106 and 107 convey other operational status information classified as "Type-2" and "Type-3" data, respectively, together with their reception and occurrence timestamps.

Figure 4:
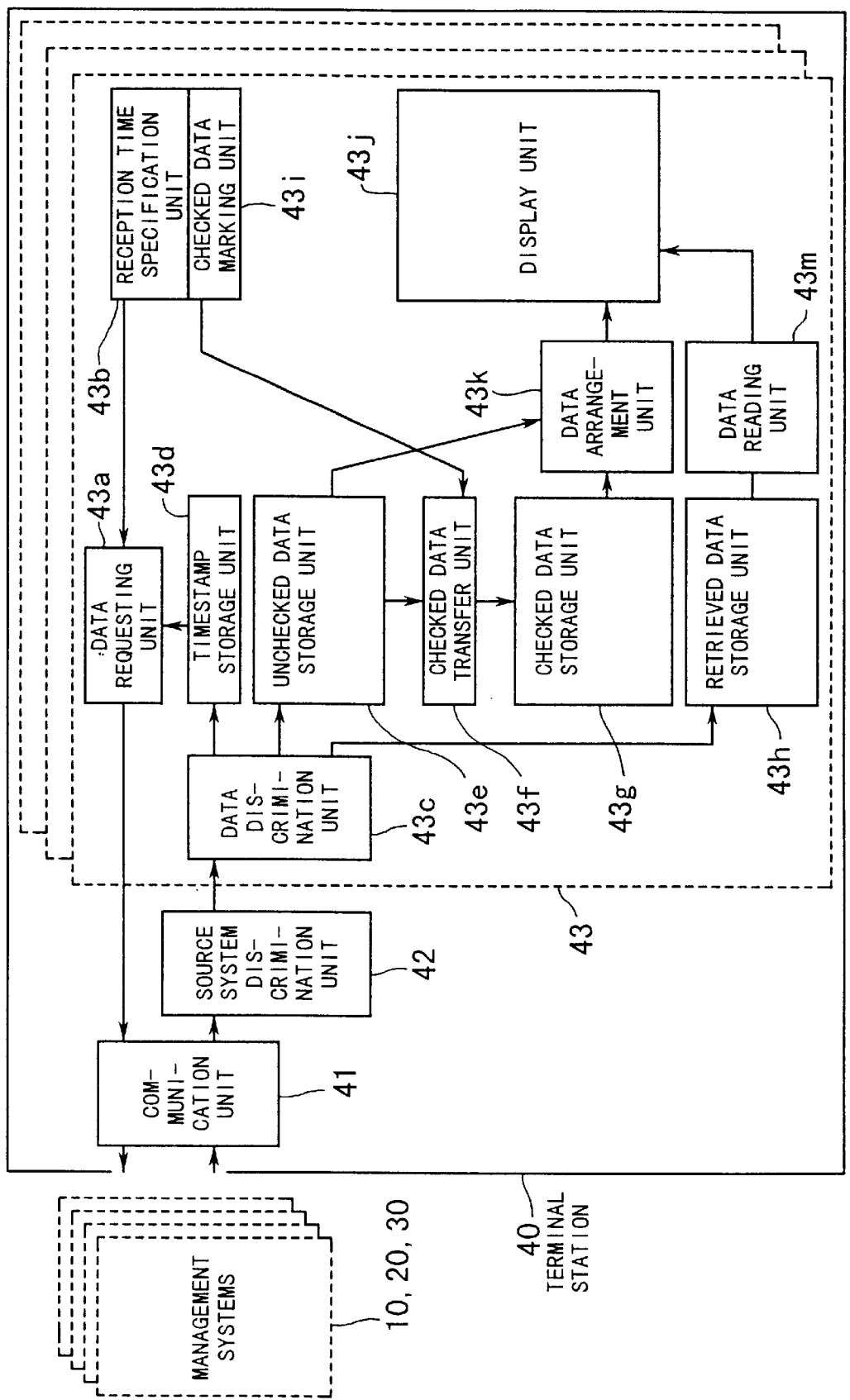
FIG. 4 is a diagram which shows the internal structure of a terminal station.

Referring now to FIG. 4, the following section explains the internal structure of the terminal station 40. The other terminal stations 50 and 60 shown in FIG. 2 have the same internal configuration as the terminal station 40. although not explicitly depicted in the accompanying drawings, the terminal station 40 comprises a data processing unit composed of a CPU, RAM, ROM, I/O ports, and other components. All the blocks of the terminal station 40 of FIG. 4 are actually implemented as hardware and software functions of this data processing unit.

In FIG. 4, a communication unit 41 serves as an interface that allows the terminal station 40 to make access to the management systems 10, 20, and 30 over the communications network. More specifically, the terminal station 40 accepts data messages from management systems when their "Destination Terminal station" field 102 indicates the name of its own. To separately handle the messages received from different management systems, the terminal station 40 employs a plurality of processing units 43. The received data messages are distributed to appropriate processing units through a source system discrimination unit 42, which discriminates between the data messages by examining their "Source Management System" field 101 indicative of which management system has sent them.

As part of each processing unit 43, a data requesting unit 43*a* automatically transmits data delivery request messages at regular intervals. Each request message contains a reception time specification that designates the earliest reception timestamp value of data records being requested. The processing unit 43 is designed to supply this reception time specification from two sources; one is a timestamp storage unit 43*d* and the other is a reception time specification unit 43*b*. The former source is used when the data delivery request messages are transmitted on a regular basis as mentioned above. The latter source, the reception time specification unit 43*b*, will be activated when the operator types in a command for requesting the delivery of collected data records, explicitly giving a time specification for qualifying the records to be retrieved. In response to this operator command, the data requesting unit 43*a* transmits a data delivery request message to the intended management system.

Figure 6:
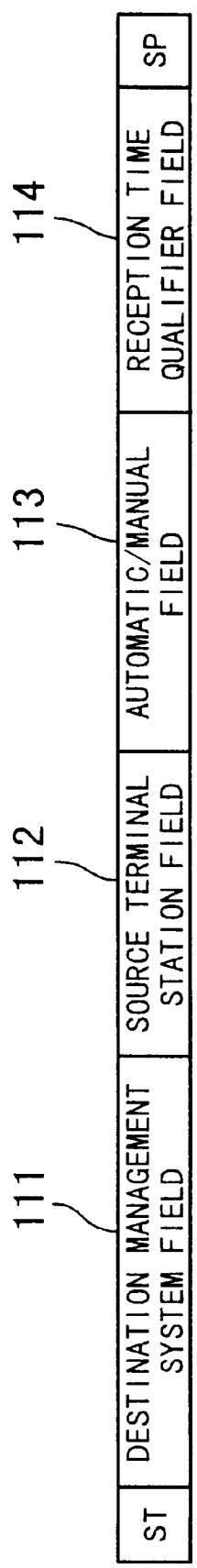
FIG. 6 is a diagram which shows the frame format of a data delivery request message.

FIG. 6 shows the frame format of this data delivery request message. The message of FIG. 6 has a "Destination Management System" field 111 to describe the name of a specific management system to which the message is addressed, and the next "Source Terminal station" field 112 shows the name of a terminal station which is requesting data delivery. An "Automatic/Manual" field 113 indicates whether the present request message has been issued automatically or manually. That is, "Automatic" denotes that the message is produced by the requesting terminal station at regular intervals. As opposed to this, "Manual" means that the operator of the terminal station has entered a command to request information for some specific reason. The message further has a "Reception Time Qualifier" field 114 to convey the reception time specification determined automatically or manually as already explained above.

Referring back to FIG. 4, a data discrimination unit 43*c* examines the Automatic/Manual field 103 of each data message delivered from a management system. If the field value is "Automatic," the data discrimination unit 43*c* supplies an unchecked data storage unit 43*e* with the contents of the message's Transmission Time field 104 and the Type-1 to Type-3 data fields 105 to 107. The value of Transmission Time field 104 is sent also to the timestamp storage unit 43*d*. If the Automatic/Manual field 103 reads "Manual," the data discrimination unit 43*c* sends the contents of the Type-1 to Type-3 data fields 105 to 107 to a retrieved data storage unit 43*h*.

The timestamp storage unit 43*d* saves the received transmission time field value. This saved value is copied to the "Reception Time Qualifier" field 114 of a data delivery request message when the data requesting unit 43*a* transmits it on a regular basis. The unchecked data storage unit 43*e* stores the transmission time and the information contained in the data fields 105 to 107 supplied from the data discrimination unit 43*c*.

Figure 7:
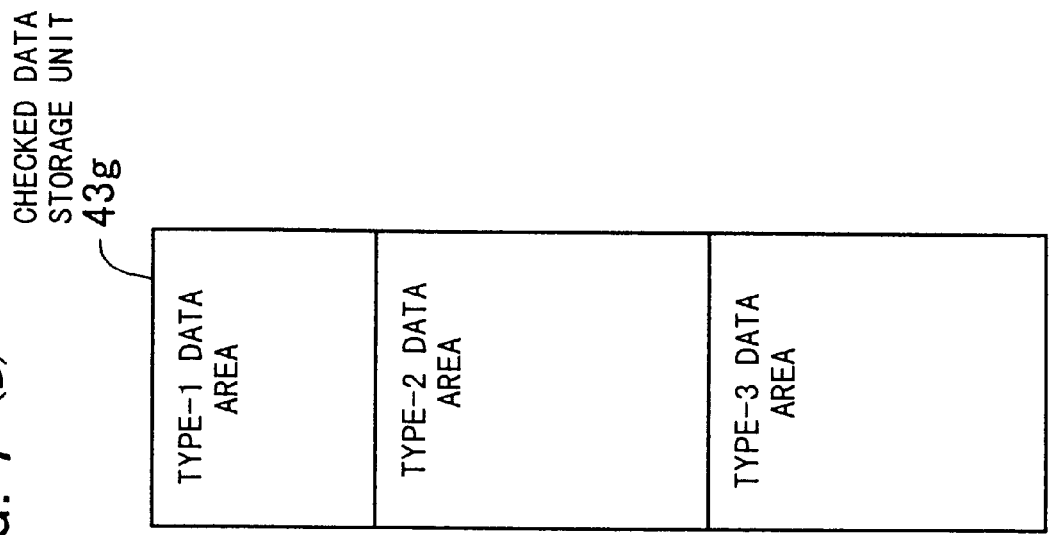
FIG. 7(A) is a diagram which shows the internal memory configuration of an unchecked data storage unit.
FIG. 7(B) is a diagram which shows an internal memory configuration of a checked data storage unit.

FIG. 7(A) shows the internal memory configuration of this unchecked data storage unit 43*e*. More specifically, the memory area is composed of one "Transmission Time" area and three separate data areas named "Type-1 Data," "Type-2 Data," and "Type-3 Data." These four areas are used to buffer the corresponding fields 104 to 107 supplied from the data discrimination unit 43*c*. Type-1 to Type-3 data records stored in these areas are referred to as "unchecked data records," since they have not been presented to the operator. When checked and processed by the operator, these records are transported to a checked data storage unit 43*g*, while unfinished records remains in the unchecked data storage unit 43*e*. That is, the checked data storage unit 43*g* only stores the data records that are marked as "checked" by a checked data transfer unit 43*f* (described later). Here, the checked data records are classified into groups of different types, as in the unchecked data storage unit 43*e*.

FIG. 7(B) shows the internal memory configuration of this checked data storage unit 43*g*. The checked data storage unit 43*g* is divided into three storage areas named Type-1 Data to Type-3 Data. Because of its limited memory capacity, old data in each storage area will be discarded when an excessive amount of new data records are received. A data arrangement unit 43*k* reads out the records stored in the unchecked data storage unit 43*e* and checked data storage unit 43*g*, and sends them to a display unit 43*j* after arranging them through appropriate editing operations. The display unit 43*j* presents the resultant data to the operator.

Figure 8:
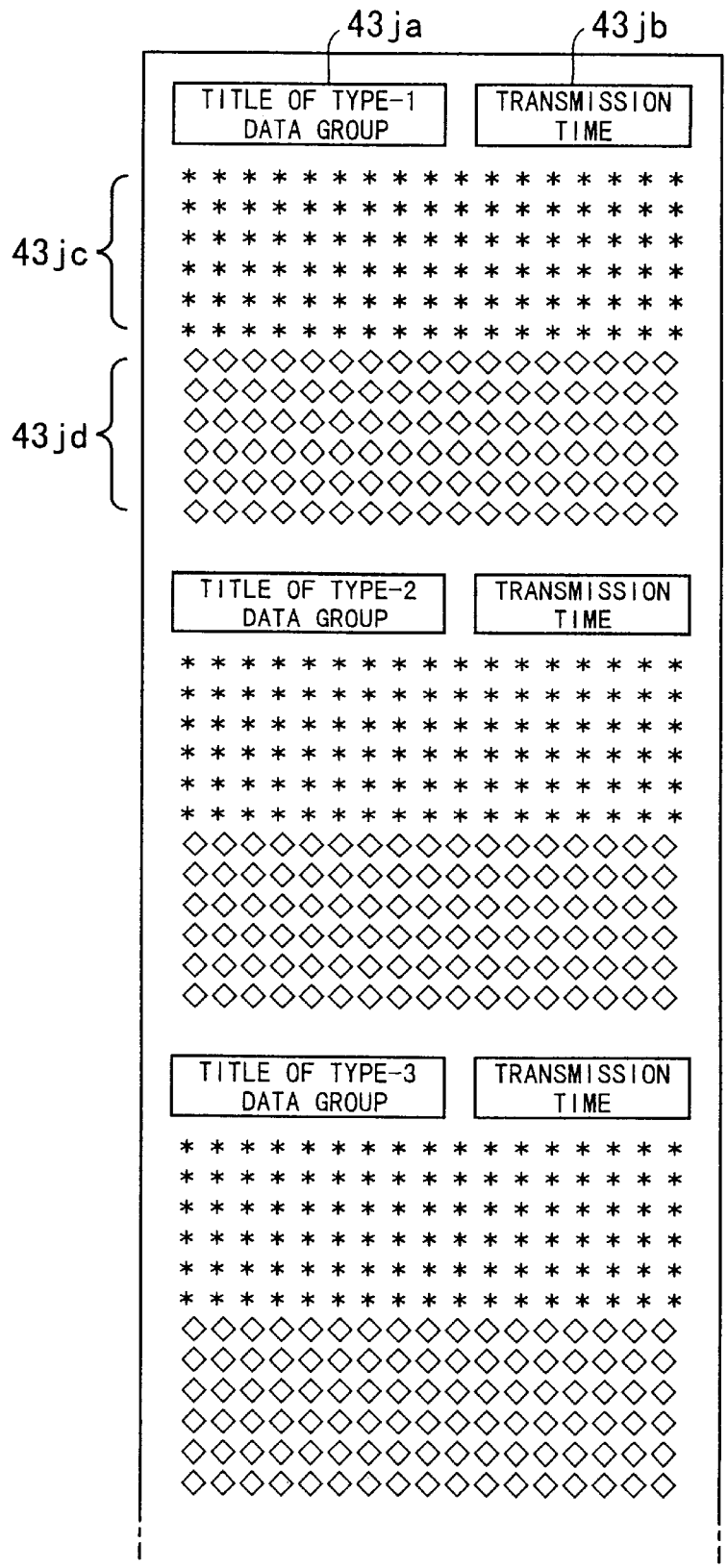
FIG. 8 is a diagram which illustrates rearranged data records to be presented on a display unit.

FIG. 8 illustrates edited data records to be output to the display unit 43*j*. The records are classified into groups according to the types of data content, and each group includes the title of data type, transmission time, unchecked data records, and checked data records. More specifically, the Type-1 data group, for instance, contains the title of Type-1 Data 43*ja*, a transmission time 43*jb*, unchecked data records 43*jc*, and checked data records 43*jd*. The unchecked data records 43*jc* and checked data records 43*jd* consist of multiple pieces of operational status information arranged in chronological order. The display unit 43*j* displays such text data from its top line. The operator can scroll the screen back and forth to browse the entire text. Data records delivered from other management systems will also be arranged as separate sets of information in the same way as shown in FIG. 8, while the display unit 43*j* can be shared for all management systems.

Referring again to FIG. 4, the operator sitting at the terminal station 40 checks for the information presented on the display unit 43j. Suppose, for example, that some information included in the unchecked data records 43jc as part of the Type-1 data has captured the operator's attention. He/she then confirms the events or status changes occurred and/or takes necessary action to solve the problem, if any. When the action is done, the operator notifies a checked data transfer unit 43f of the completion through a checked data marking unit 43i. Upon receipt of this completion notification, the checked data transfer unit 43f moves the relevant part of the data records from the unchecked data storage unit 43e to the checked data storage unit 43g. Here, the records transferred and stored as such are referred to as "checked data records."

A data reading unit 43m reads data records out of the retrieved data storage unit 43h and simply forwards them to the display unit 43j to present the stored information to the operator.

Referring now to FIGS. 9 to 12, the following section will explain a series of processes executed by the above data delivery and reception system. The explanation covers: how the management system 10 collects and stores data, how the terminal station 40 requests the delivery of data records, and how the management system 10 responds to the request.

Figure 9:
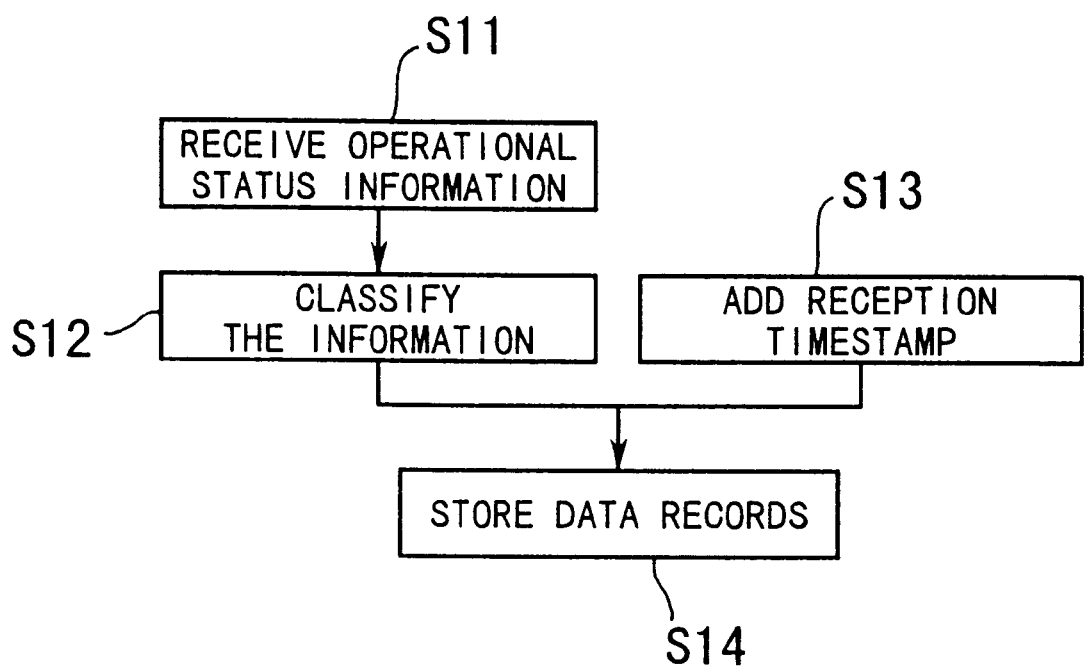
FIG. 9 is a flowchart which shows a process executed by a management system to collect and store operational status information.

FIG. 9 is a flowchart showing a process to be executed by the management system 10 to collect and store the operational status information. The following section describes the details of this process, citing the step numbers (S11 to S14) shown in FIG. 9 for reference and assuming the management system structure of FIG. 3.

In operation of the management system 10, the data input unit 11 receives operational status information from a plurality of subsystems 71 to 74 (Step S11). The received information is classified into groups according to the types of data content (Step S12). Based on the local timebase of the management system 10, the reception time setting unit 12a and first combination unit 13 affix a reception timestamp to each piece of the received operational status information (Step S13). The information is then stored into the data storage unit 14 separately for each data type (Step S14). Here, the records are sorted in chronological order, and each individual data record contains an event occurrence time stamped at its source location.

Figure 10:
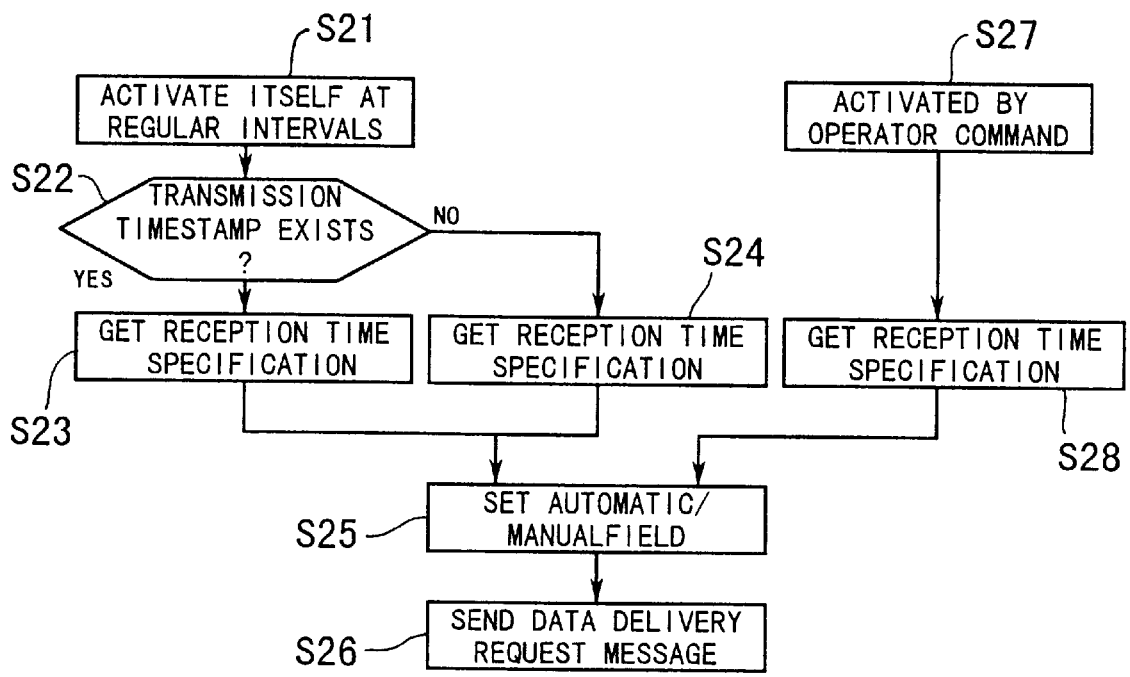
FIG. 10 is a flowchart which shows a process executed by a terminal station to request the management system to deliver the collected data records.

FIG. 10 is a flowchart showing a process executed by the terminal station 40 when it attempts to request the management system 10 to deliver the collected operational status information. The following section describes the details of this process, citing the step numbers (S21 to S28) shown in FIG. 10 for reference and assuming the terminal station structure of FIG. 4.

In operation of the terminal station 40, the data requesting unit 43a activates itself at predetermined intervals, without manual intervention (Step S21). Upon activation, it determines whether the timestamp storage unit 43d has a record of transmission time, or a transmission timestamp (Step S22). The presence of such a record teaches that the data requesting unit 43a once issued a data delivery request message generated as a result of its regular task. The data requesting unit 43a then reads the stored transmission timestamp (Step S23), and enters it to the Reception Time Qualifier field 114 of the next data delivery request message. This allows the collected operational status information to be completely delivered from the management system 10 to the terminal station 40, without duplicated transmission of data messages.

The terminal station 40 may fail to find transmission timestamps in the timestamp storage unit 43d, when it is in the initial state, or when there is some problem with it. In such situations, the data requesting unit 43a prompts the operator to enter a reception time specification, and when it is entered, the data requesting unit 43a copies the value to the Reception Time Qualifier field 114 of a data delivery request message to be sent (Step S24). The data requesting unit 43a further sets "Automatic" to the Automatic/Manual field 113 of the message (Step S25). The communication unit 41 transmits this data delivery request message to the management system 10 (Step S26).

When the operator is unable to find desired status information in the local storage of the terminal station 40, he/she will attempt to fetch the necessary information from the management system 10. More specifically, the operator manually issues a data retrieval request to the data requesting unit 43a, designating a reception time specification through the reception time specification unit 43b (Step S27). The data requesting unit 43a places the reception time specification into the Reception Time Qualifier field 114 of a data delivery request message to be transmitted (Step S28) and sets "Manual" to the Automatic/Manual field 113 of the same message (Step S25). The communication unit 41 transmits this data delivery request message to the management system 10 (Step S26).

Figure 11:
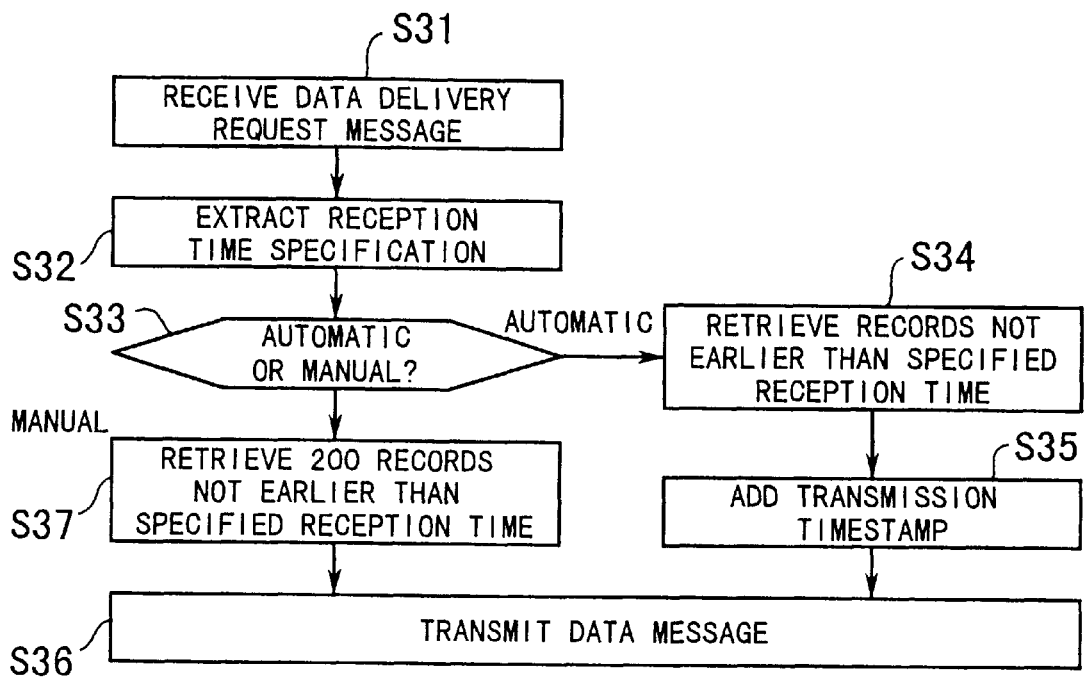
FIG. 11 is a flowchart showing a process executed by a management system, in which a data distribution request message is received from a terminal station, and relevant data records are retrieved and delivered to the requesting terminal station.

FIG. 11 is a flowchart which shows a process executed by the management system 10. In this process, the management system 10 receives a data delivery request message from the terminal station 40, retrieves relevant data records, and sends them back to the requesting terminal station 40. The following section describes the details of the process, citing the step numbers (S31 to S37) shown in FIG. 11 for reference and assuming the terminal station structure of FIG. 3.

In the management system 10, the data request reception unit 18 receives a data delivery request message sent from the terminal station 40. If the received message has the name of the management system 10 in its Destination Management System field 111, the data request reception unit 18 passes the message to the data retrieval unit 15 (Step S31). The data retrieval unit 15 extracts a reception time specification contained in the Reception Time Qualifier field 114 of the message (Step S32). It further checks the Automatic/Manual field 113 of the message (Step S33), and if that field reads "Automatic," it then searches the records in the data storage unit 14 for all types of data records, so as to retrieve the relevant records having reception timestamps that are not earlier than the extracted reception time specification (Step S34). The obtained data records are then sent to the second combination unit 16. When the Automatic/Manual field 113 of the data delivery request message shows "Automatic," the second combination unit 16 directs the data records to the data transmission unit 17 after adding a transmission timestamp as specified by the transmission time setting unit 12b. The data transmission unit 17 loads the data records into their respective data fields (i.e., either of the Type-1 Data field 105 to Type-3 Data field 107) of a data message to be transmitted. The data transmission unit 17 then sets "Automatic" to the Automatic/Manual field 103 of the message, as well as entering the above transmission timestamp to the Transmission Time field 104 (Step S35). Finally, the data message constructed as such is delivered to the terminal station 40 (Step S36).

Returning to step S33, when the Automatic/Manual field 113 reads "Manual," the data retrieval unit 15 searches the data storage unit 14 for all types of data records, so as to obtain the relevant records having reception timestamps that are not earlier than the extracted reception time specification (Step S37). If the number of retrieved records exceeds a predetermined threshold (e.g., 200 records), the data retrieval unit 15 stops further search and discards the excessive part of the retrieved records. The obtained records are then transferred to the second combination unit 16. When the Automatic/Manual field 113 of the data delivery request message reads "Manual," the second combination unit 16 simply forwards the obtained records to the data transmission unit 17, adding no transmission timestamps as opposed to the case of "Automatic." The data transmission unit 17 constructs a data message by: (1) distributing the records to the corresponding data fields 105 to 107, (2) setting "Manual" to the Automatic/Manual field 103, and (3) giving a void timestamp code (e.g., "FFFF") to the Transmission Time field 104. This data message is transmitted to the terminal station 40 (Step S36).

Figure 12:
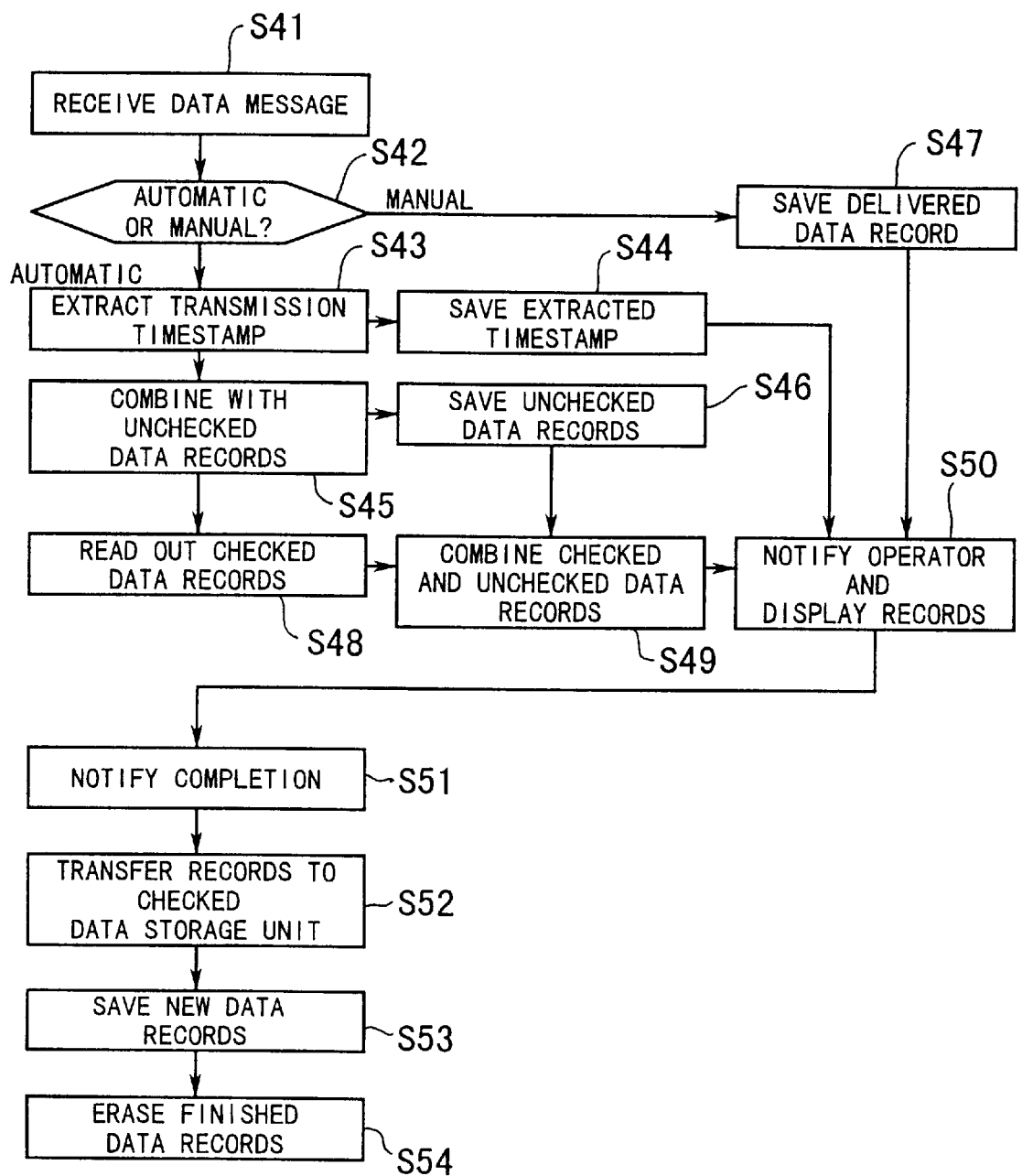
FIG. 12 is a flowchart showing a process executed by a terminal station, in which a data message is received from a management system and its contents are checked by an operator.

FIG. 12 is a flowchart which shows a process executed by the terminal station 40, in which a data message from the management system 10 is received and presented to the operator for checking purposes. The following section describes the details of this process, citing the step numbers (S41 to S54) shown in FIG. 12 for reference and assuming the terminal station structure of FIG. 4.

In the terminal station 40, the communication unit 41 receives a data message sent from the management system 10. If the received message has the name of the terminal station 40 in its Destination Terminal Station field 102, the communication unit 41 supplies the message to the source system discrimination unit 42. The source system discrimination unit 42 then examine s the Source Management System field 101 of the message and sends the received data message to one of the processing units 43 that is relevant to the source management system described therein (Step S41).

The data discrimination unit 43c examines the value of the Automatic/Manual field 103 of the message (Step S42). When the field 103 reads "Automatic," then the data discrimination unit 43c extracts the message's Transmission Time field 104 (Step S43) and saves it into the timestamp storage unit 43d (Step S44). The data discrimination unit 43c further supplies the unchecked data storage unit 43e with the contents of the Transmission Time field 104 and the Type-1 to Type-3 data fields 105 to 107 to save them into the data areas prepared for them (Steps S45 and S46). When in turn the field 103 reads "Manual," the data discrimination unit 43c sends the Type-1 to Type-3 data fields 105 to 107 of the received message to the retrieved data storage unit 43h to save them (Step S47).

The data arrangement unit 43k reads out the records retained in the checked data storage unit 43g (Step S48) and also the unchecked data records stored in the unchecked data storage unit 43e. It funnels those records into a single stream (Step S49) and sends them to the display unit 43; (Step S50). In the "Manual" mode, the data reading unit 43m fetches data records from the retrieved data storage unit 43h and feeds them to the display unit 43j (Step S50).

The operator sitting at the terminal station 40 browses through the information presented on its display unit 43j, thus taking necessary action to confirm the events occurred and/or to solve the problem, if any. When the action is finished, the operator notifies the checked data transfer unit 43f of the completion through the checked data marking unit 43i (Step S51). Upon receipt of this completion notification, the checked data transfer unit 43f relocates the checked data records from the unchecked data storage unit 43e to the checked data storage unit 43g (Step S52).

When the number of checked records has exceeded a predetermined threshold, the checked data storage unit 43g discards old ones to gain a space enough to save new data records (Step S53). In turn, the unchecked data storage unit 43e erases the records that have just been checked by the operator and transferred to the checked data storage unit 43g (Step S54). In this way, the management system 10 and terminal station 40 cooperate to accomplish a series of operations to deliver and receive the collected operational status information.

The above described embodiment of the present invention has assumed such an environment where a plurality of management systems control the network by collecting status information from network devices and a network operator makes access to those remote management systems through his/her local terminal station. The present invention, however, is not limited to the systems of this kind. As an alternative application, the present invention can also be implemented in a client-server system based on the Internet or other on-line services. In this case, servers are management systems, and clients are terminal stations. Various data to be delivered from the servers to the clients corresponds to what has been discussed so far as the operational status information or data records.

The above discussion is summarized as follows. According to the present invention, the management system adds a reception timestamp to each piece of operational status information collected from a plurality of subsystems, based on the management system's local timebase. Terminal stations are configured to send a data delivery request to the management system, designating a reception time specification. When such a data delivery request is received, the management system retrieves data records whose reception timestamps are not earlier than the given reception time specification, and returns them to the requesting terminal station. This data delivery mechanism reduces the workloads imposed on the management system, thus allowing the design of the management system to be compact and simple.

Furthermore, according to the present invention, each terminal station is designed to manages the time range of data records it has received, by using transmission timestamps affixed to the received records. Based on this timestamp information, the terminal station provides a reception time specification as a search keyword, when it requests again the delivery of collected data records. Accordingly, the management system only has to search the stored records just as specified by the terminal station. This mechanism greatly alleviates the workloads imposed on the management system, thus allowing its design to be compact and simple.

In the present invention, individual terminal stations are responsible for managing data records that they received by marking each record as checked or unchecked, as opposed to the conventional configurations, in which the management systems must do such marking operations. This alleviates the burden of data management tasks and enables the management system to be implemented on a simple platform.

Further, the present invention configures management systems to provide a transmission timestamp when delivering collected data records to terminal stations. This transmission timestamp is once saved in the terminal station and sent back to the management system as a reception time specification next time it issues a data delivery request. The management system delivers data records having reception timestamps not earlier than the reception time specification, and accordingly, data records once sent to a specific terminal station will never be retransmitted to the same destination. Besides shortening the time spent for each message transmission, this mechanism reduces the consumption of network bandwidth.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data reception system implemented in at least one terminal station which can connect to at least one management system to make access to data collected and maintained therein, comprising:

data requesting means for sending a data delivery request to the management system to deliver data records being stored therein, the request including a time specification for qualifying the data records to be delivered, the management system storing the data records together with reception timestamps indicative of a moment at which each piece of information is received;

timestamp storage means for storing a transmission timestamp affixed to the data records that are retrieved and transmitted by the management system, the retrieved data record having the reception timestamps not earlier than the time specification included in the data delivery request, the transmission timestamp indicating a moment when the management system is about to transmit the retrieved data records; and data reception means for receiving the data records retrieved and sent by the management system.

2. The data reception system according to claim 1, wherein said data reception means comprises data arrangement means for arranging the data records retrieved and transmitted by the management system and sending the arranged data records to a display unit.

3. The data reception system according to claim 2, wherein:

said data reception means comprises
unchecked data storage means for storing the data records retrieved and transmitted by the management system, and
checked data storage means for storing data records that have been checked by an operator of the data reception system; and said data arrangement means reads out a first set of data records from said unchecked data storage means, reads out a second set of data records from said checked data storage means, and combines the first and second sets of data records to output to the display unit.

4. The data reception system according to claim 3, wherein said data reception means further comprises:

checked data marking means for identifying checked data records, based on a data checking operation performed by the operator with respect to each data record presented on the display unit; and checked data transferring means for transferring the checked data records identified by said checked data marking means from said unchecked data storage means to said checked data storage means.

5. The data reception system according to claim 4, wherein:

said data requesting means comprises
first data retrieval requesting means for requesting the management system to retrieve and deliver the data records at regular intervals, and second data retrieval requesting means for requesting the management system to retrieve and deliver the data records on an on-demand basis; and said first data retrieval requesting means reads out the transmission timestamp stored in said timestamp storage means, for use as the time specification.

6. The data reception system according to claim 1, wherein said data reception means further comprises:

retrieved data storage means for storing the data records that the management system has retrieved and transmitted in response to the data delivery request issued by said data requesting means on an on-demand basis; and data reading means for reading the data records out of said retrieved data storage means to output to a display unit.

7. A data delivery system, implemented in at least one management system which collects and manages data, for delivering the data to at least one terminal station which can connect to said at least one management system, the data delivery system comprising:

data storage means for storing data records together with reception timestamps indicative of the time when each data is received by the management system;

data retrieving means, responsive to a data delivery request with a time specification sent from the terminal station, for retrieving, out of said data storage means, relevant data records whose reception timestamps are not earlier than the time specification; and data transmission means for transmitting to the terminal station the data records retrieved by said data retrieving means, together with a transmission timestamp indicating a moment when said data transmission means is about to transmit the retrieved data records.

8. The data delivery system according to claim 7, further comprising means for directing said data transmission means to transmit a void transmission timestamp together with the data records retrieved in response to the data delivery request, when the data delivery request is generated on an on-demand basis.

9. A system for controlling data delivery and reception in an environment where at least one management system collects and manages data and at least one terminal station connects to said at least one management system to make access to the data stored therein, comprising:

data storage means, disposed in the management system, for storing data records together with reception timestamps indicative of the time when each data is received by the management system;

data requesting means, disposed in the terminal station, for sending a request to the management system to deliver the data records, the request including a time specification for qualifying the data records to be delivered;

data retrieving means, disposed in the management system and responsive to the request sent from said data requesting means, for retrieving, out of said data storage means, relevant data records whose reception timestamps are not earlier than the time specification included in the request;

data transmission means, disposed in the management system, for transmitting to the terminal station the data records retrieved by said data retrieving means, together with a transmission timestamp indicating a moment when the management system is about to transmit the retrieved data records;

timestamp storage means, disposed in the terminal station, for storing the transmission timestamp sent together with the data records from said data transmission means; and data reception means, disposed in the terminal station, for receiving the data records sent from said data transmission means.

10. A method of controlling data delivery and reception in an environment where at least one management system collects and manages data and at least one terminal station connects to said at least one management system to make access to the data stored therein, comprising the steps of:

(a) storing collected data records in the management system, together with reception timestamps indicative of a moment at which each piece of information is received by the management system;

(b) issuing a data delivery request from the terminal station to the management system, including a time specification for qualifying the data records to be delivered;

(c) in response to the data delivery request issued in said step (b), searching the data records stored in said step (a) to retrieve relevant data records whose reception timestamps are not earlier than the time specification included in the data delivery request;

(d) transporting the data records retrieved in said step (c) from the management system to the terminal station, together with a transmission timestamp indicating a moment when the management system is about to transmit the retrieved data records;

(e) saving the transmission timestamp affixed to the data records transported to the terminal station in said step (d); and (f) receiving the data records transported to the terminal station in said step (d).

* * * * *